United States Patent
Xu et al.

(10) Patent No.: US 12,078,914 B1
(45) Date of Patent: Sep. 3, 2024

(54) CAMERA FOCUS LOCKING MECHANISM

(71) Applicant: Apple Inc., Cupertino, CA (US)

(72) Inventors: Bin Xu, Sunnyvale, CA (US); Aurelien R Hubert, San Jose, CA (US); Xu Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 17/815,932

(22) Filed: Jul. 28, 2022

(51) Int. Cl.
| | |
|---|---|
| *G03B 17/12* | (2021.01) |
| *G03B 13/34* | (2021.01) |
| *H04N 23/55* | (2023.01) |
| *H04N 23/667* | (2023.01) |

(52) U.S. Cl.
CPC ............. *G03B 17/12* (2013.01); *G03B 13/34* (2013.01); *H04N 23/55* (2023.01); *H04N 23/667* (2023.01)

(58) Field of Classification Search
None
See application file for complete search history.

(56) References Cited

U.S. PATENT DOCUMENTS

| | | | | |
|---|---|---|---|---|
| 4,636,625 | A * | 1/1987 | Emoto | G11B 7/0908 |
| 10,739,551 | B1 * | 8/2020 | Kashyap | G02B 7/08 |
| 2017/0031131 | A1 * | 2/2017 | Chan | G02B 7/102 |
| 2020/0137295 | A1 * | 4/2020 | Zhong | H04N 23/695 |
| 2021/0208475 | A1 * | 7/2021 | Park | H04N 23/54 |
| 2022/0214432 | A1 * | 7/2022 | Lee | G02B 5/20 |

* cited by examiner

*Primary Examiner* — Mark T Monk
(74) *Attorney, Agent, or Firm* — Robert C. Kowert; Kowert, Hood, Munyon, Rankin & Goetzel, P.C.

(57) ABSTRACT

Various embodiments include a locking mechanism for a camera. The locking mechanism may be used to provide a clamping force that prevents one or more components of the camera from moving along one or more axes in some examples. According to various embodiments, the locking mechanism may include a ferromagnetic plate fixedly attached to a carrier (e.g., a lens carrier, an image sensor carrier, etc.), an electromagnet for electromagnetically interacting with the ferromagnetic plate, and a flexure to which the electromagnet may be attached. The flexure may further be attached to a stationary structure of the camera. In some embodiments, the camera may be operable such that, in a lock mode of the camera, the electromagnet is electrically driven to generate a magnetic field that attracts the ferromagnetic plate, thereby providing a clamping force that prevents the carrier from moving along an optical axis of the camera.

20 Claims, 11 Drawing Sheets

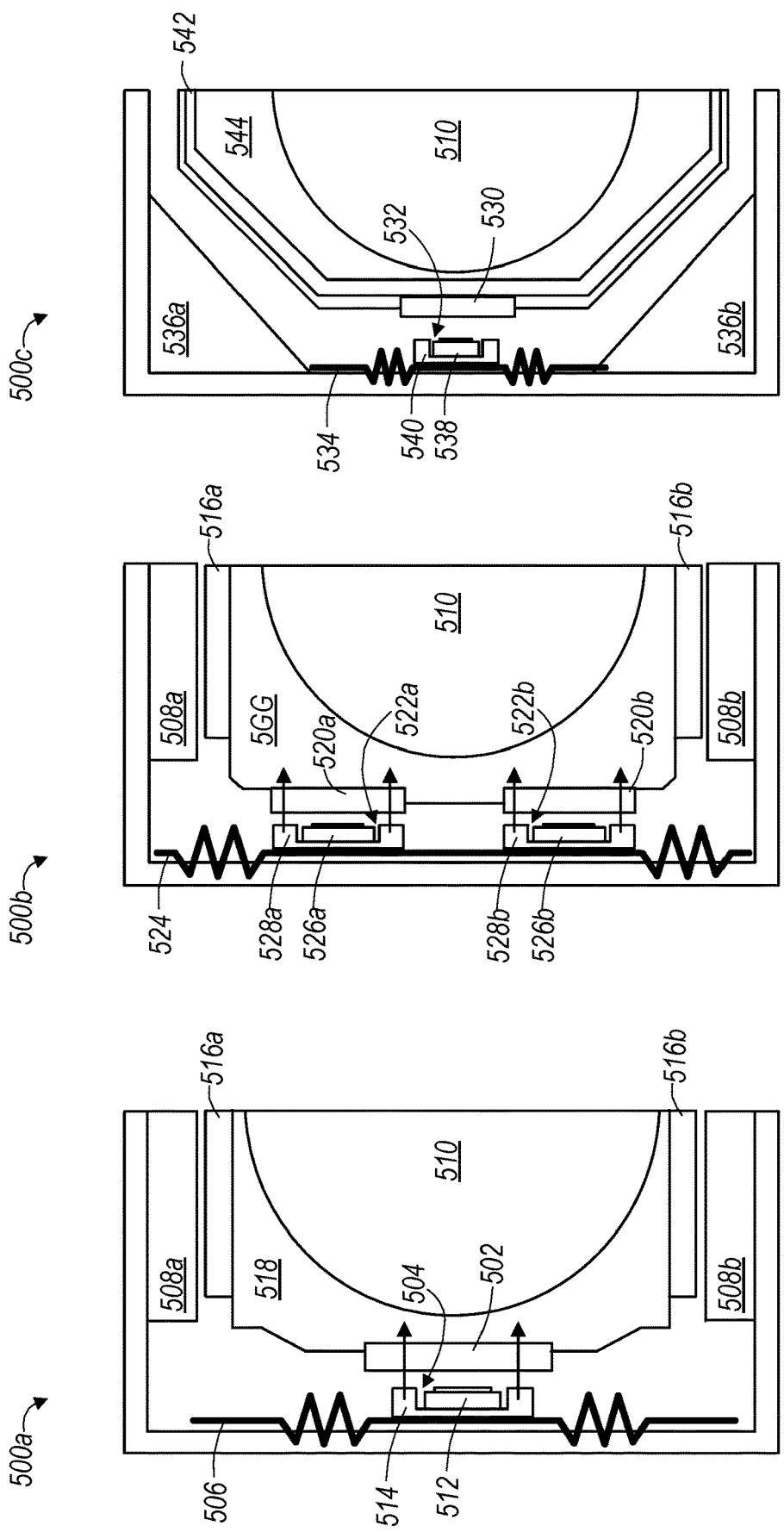

US 12,078,914 B1

CAMERA FOCUS LOCKING MECHANISM

BACKGROUND

Technical Field

This disclosure relates generally to a locking mechanism that may be used to prevent one or more camera components from moving along one or more axes.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIG. 1A shows an example state in which the camera system is focusing. FIG. 1B shows an example state in which the camera system is activating a locking mechanism. FIG. 1C shows an example state in which the camera system is clamping, using the locking mechanism, a carrier of the camera.

FIG. 3A shows an exploded perspective view of the camera system. FIG. 3B shows a collapsed perspective view of the camera system. FIG. 3C shows a side cross-sectional view, taken at section plane A-A indicated in FIG. 3B, of the camera system. FIG. 3D shows another perspective view of the camera system. FIG. 3E shows a side cross-sectional view, taken at section line B indicated in FIG. 3D, of the camera system. FIG. 3F shows another side cross-sectional view, taken at section line C-C indicated in FIG. 3D, of the camera system.

FIGS. 5A-5C illustrate respective example arrangements for locking mechanisms of camera systems, in accordance with some embodiments. FIG. 5A shows a top view of a first locking mechanism arrangement that may be used in a camera system that has side magnets. FIG. 5B shows a top view of a second locking mechanism arrangement that may be used in a camera system that has side magnets. FIG. 5C shows a top view of another locking mechanism arrangement that may be used in a camera system that has corner magnets.

FIG. 6A shows a top view of an example flexure arm arrangement. FIG. 6B shows a top view of an example clad flexure arrangement. FIG. 6C shows a top view of an example leaf spring flexure arrangement.

Figure 1A:
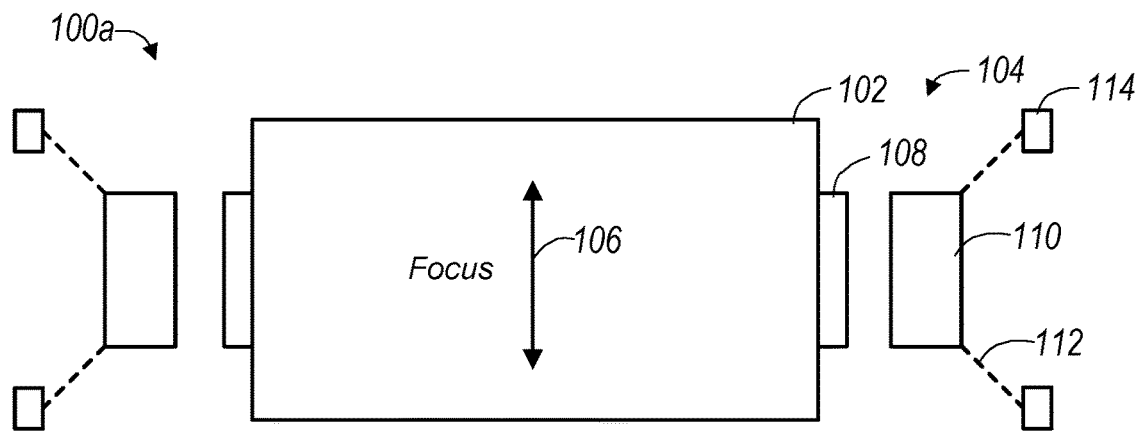
FIGS. 1A-1C illustrate schematic block diagrams of an example camera system that includes a locking mechanism that may be used to lock a position of one or more components, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises," and/or "comprising." when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments include a camera with a locking mechanism that may be used to lock a position of one or more camera components. In some examples described herein, the terms "camera" and "camera system" may be used interchangeably. In some embodiments, the locking mechanism may be used to provide a clamping force that prevents one or more components of the camera from moving along one or more axes. According to various embodiments, the locking mechanism may include a ferromagnetic plate fixedly attached to a carrier (e.g., a lens carrier, an image sensor carrier, etc.), an electromagnet for electromagnetically interacting with the ferromagnetic plate, and a flexure to which the electromagnet may be attached. The flexure may further be attached to a stationary structure of the camera. In some embodiments, the camera may be operable such that, in a lock mode of the camera, the electromagnet is electrically driven to generate a magnetic field that attracts the ferromagnetic plate, thereby providing a clamping force that prevents the carrier from moving along an optical axis of the camera.

In some embodiments, the camera may be operable in a lock mode, which may trigger activation of the locking mechanism. For example, the lock mode may be an option provided via a user interface of the camera system. A user of the camera system may enable the lock mode via the user interface, e.g., when the user would like to lock a focus position of the camera system during activities in which the user (and the camera system) will be experiencing a high degree of motion and/or during which the user may have a lower degree of control of the camera system. Non-limiting examples may include "active" users who would like to capture video using the camera system while riding a motorcycle, snowboarding, etc.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1B:
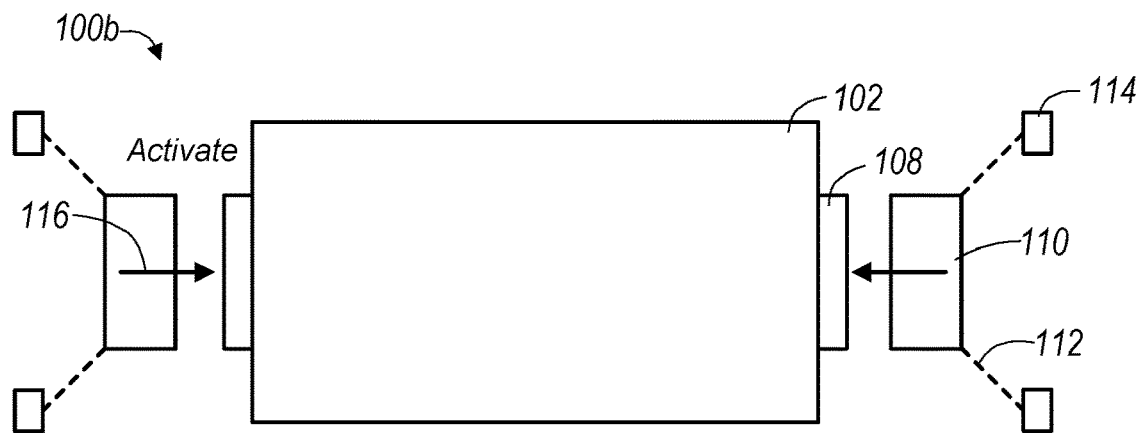
Figure 1C:
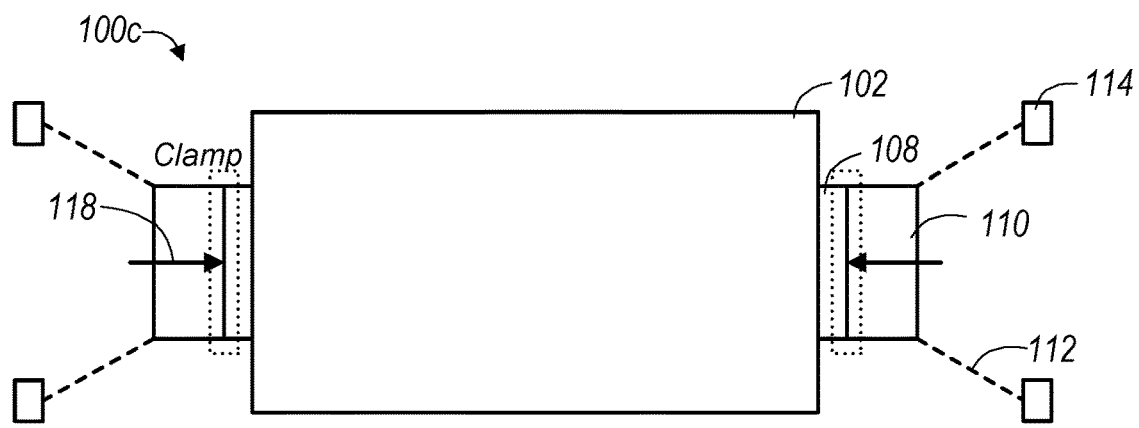

FIGS. 1A-1C illustrate schematic block diagrams of an example camera system that includes a locking mechanism, in accordance with some embodiments. FIG. 1A shows an example state 100a in which the camera system is focusing. FIG. 1B shows an example state 100b in which the camera system is activating a locking mechanism. FIG. 1C shows an example state 100c in which the camera system is clamping, using the locking mechanism, a carrier of the camera system.

According to various embodiments, the camera system may include a carrier 102 and a locking mechanism 104. In some examples, the carrier 102 may be a movable lens carrier to which a lens group is attached. In other examples, the carrier 102 may be a movable image sensor carrier to which an image sensor is attached. As will be discussed in further detail herein with reference to at least FIGS. 2-3F, the camera system may include a focus actuator (e.g., an actuator configured to enable autofocus functionality) that can be used to move the carrier 102 toward a focus position.

As indicated in FIG. 1A, the actuator may be used to move the carrier 102 in one or more directions parallel to an optical axis of the camera system, e.g., as indicated by arrow(s) 106. In some embodiments, a lens group may be attached to the carrier 102, and the actuator may be used to move the lens group (e.g., together with the carrier 102) relative to an image sensor (which may be attached to a stationary component of the camera system in some embodiments). In some embodiments, an image sensor may be attached to the carrier 102, and the actuator may be used to move the image sensor (e.g., together with the carrier 102) relative to a lens group (which may be attached to a stationary component of the camera system in some embodiments).

In various embodiments, the locking mechanism 104 may include a ferromagnetic plate 108, an electromagnet 110, and a flexure 112. The ferromagnetic plate 108 may be fixedly attached to the carrier 102. The electromagnet 110 may be attached to the flexure 112 and may be configured to electromagnetically interact with the ferromagnetic plate 108. Further, the flexure 112 may be attached to a stationary structure 114 (e.g., a base structure) of the camera system. According to various embodiments, the camera system may be operable such that, in a lock mode of the camera, the electromagnet is electrically driven to generate a magnetic field that attracts the ferromagnetic plate, thereby providing a clamping force that prevents the carrier from moving along the optical axis.

FIG. 1B shows an example state 100b in which the camera system is activating a locking mechanism. In some embodiments, the camera system may be operable in a lock mode, which may trigger activation of the locking mechanism. For example, the lock mode may be an option provided via a user interface of the camera system. A user of the camera system may enable the lock mode via the user interface, e.g., when the user would like to lock a focus position of the camera system during activities in which the user (and the camera system) will be experiencing a high degree of motion and/or during which the user may have a lower degree of control of the camera system. Non-limiting examples may include "active" users who would like to capture video using the camera system while riding a motorcycle, snowboarding, etc.

As indicated in FIG. 1B, activation of the locking mechanism may cause the camera system to drive the electromagnet 110 (e.g., by providing an electrical current to a coil of the electromagnet 110). The electromagnet 110, when driven, may produce a magnetic field that attracts the ferromagnetic plate 108, as generally indicated by arrow 116. According to some examples, arrow 116 may be indicative of the general direction of motion of the electromagnet 110 and/or the ferromagnetic plate 108 towards one another, which may be orthogonal to the optical axis and/or to the direction(s) of focus motion (e.g., orthogonal to direction(s) indicated by arrow(s) 106 in FIG. 1A).

FIG. 1C shows an example state 100c in which the camera system is clamping. using the locking mechanism, a carrier of the camera system. As shown, in this clamping state the electromagnet 110 is positioned beside the ferromagnetic plate 108. The electromagnetic force (e.g., indicated by arrow 118) may clamp the carrier 102 in its current position (e.g., a focus position), thereby avoiding positional drift of a lens carrier relative to an image sensor or avoiding positional drift of an image sensor carrier relative to a lens group, during certain active user cases.

Figure 2:
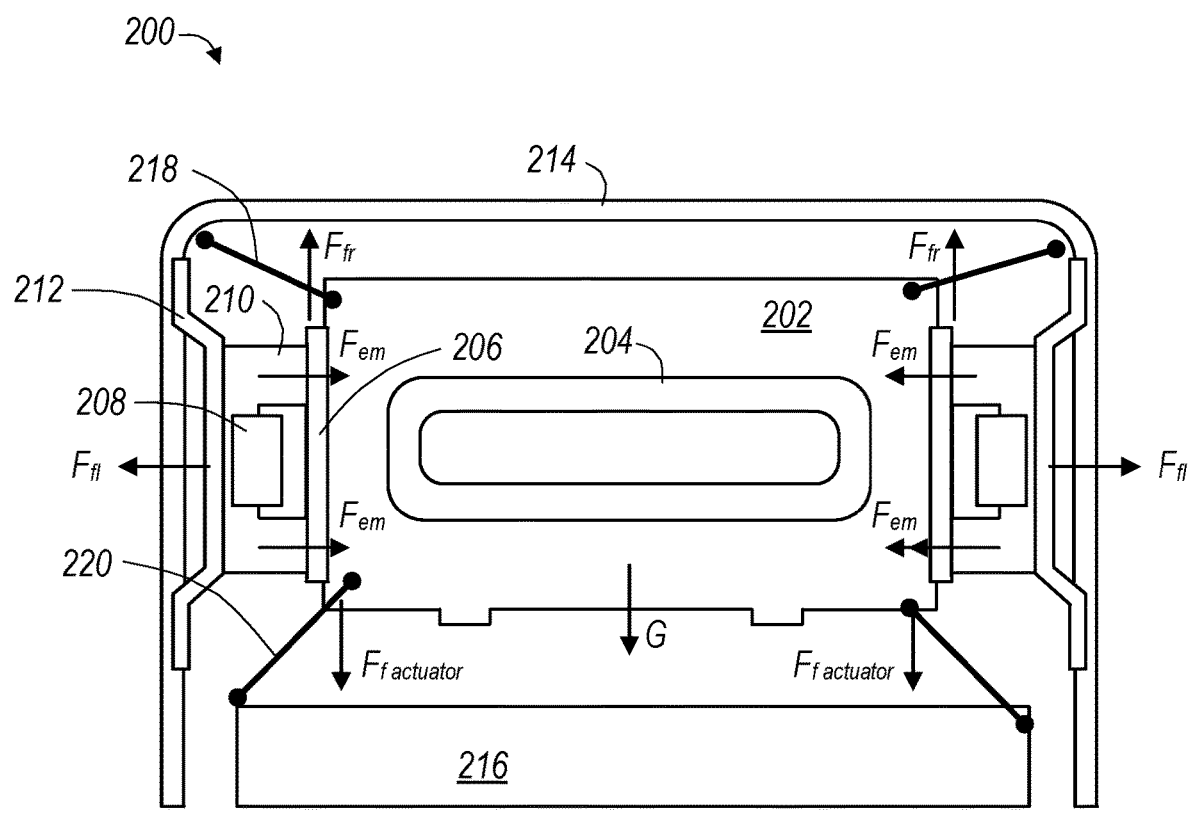
FIG. 2 illustrates a schematic free-body diagram indicating example forces that may act on a camera system that includes a locking mechanism, in accordance with some embodiments.

FIG. 2 illustrates a schematic free-body diagram indicating example forces that may act on a camera system 200 that includes a locking mechanism, in accordance with some embodiments. In some embodiments, the camera system 200 may include a carrier 202 to which one or more coils 204 of an actuator (e.g., a focus voice coil motor (VCM) actuator) may be attached. While not shown in FIG. 2, the camera system 200 may further include one or more magnets of the actuator. In some embodiments, each magnet may be positioned proximate a corresponding coil 204, such that the magnet and the corresponding coil 204 may be capable of electromagnetically interacting with one another. The electromagnetic interaction between the magnet(s) and the coil(s) 204 may produce Lorentz force(s) that move the carrier 202 in direction(s) parallel to an optical axis of the camera system 200.

In various embodiments, the locking mechanism may include one or more ferromagnetic plates 206, one or more electromagnets (e.g., comprising one or more coils 208 and one or more ferromagnetic cores 210), and one or more flexures 212. For example, in the non-limiting example illustrated in FIG. 2, the locking mechanism may include a first ferromagnetic plate 206 positioned at a first side of the carrier 202 (and/or at a first side of the camera system 200), a first electromagnet positioned at the first side, and a first flexure 212 positioned at the first side. Furthermore, in the non-limiting example illustrated in FIG. 2, the locking mechanism may include a second ferromagnetic plate 206 positioned at a second side of the carrier 202 (and/or at a second side of the camera system 200), a second electromagnet positioned at the second side, and a second flexure 212 positioned at the second side. The second side may be opposite the first side, e.g., as indicated in FIG. 2.

According to various embodiments, the example forces that may act on the camera system 200 may include electromagnetic force(s) $F_{em}$, gravitational force(s) G, friction force(s) $F_{fr}$, flexure force(s) Fn, and/or focus actuator force(s) $F_{f\_actuator}$, with example directions of such forces indicated by the corresponding arrows shown in FIG. 2.

In some embodiments, an activating condition, in which the locking mechanism is activated (e.g., as discussed herein with reference to FIG. 1B), may be characterized by the electromagnetic force(s) $F_{em}$ being greater than the flexure force(s) $F_{fl}$. With the electromagnetic force(s) $F_{em}$, corresponding to attraction forces between the electromagnet and the ferromagnetic plate, overcoming the flexure force(s) $F_{fl}$ (which tend to counteract the electromagnetic force(s) $F_{em}$), the activating condition may result in motion of the electromagnet and/or the ferromagnetic plate toward one another.

In some embodiments, a clamping condition, in which the locking mechanism is providing a clamping force that prevents the carrier from moving along the optical axis, may be based at least in part on the focus actuator design, the electromagnet design, the material design of the camera system 200, and/or the locking mechanism design. In the example illustrated in FIG. 2, the clamping condition may be characterized in the following manner:

$$G + F_{f\_actuator} = 2 \times F_{fr} = 2 \times \mu (F_{em} - F_{fl})$$

In some embodiments, the camera system 200 may further include a shield can 214, a base structure 216, one or more upper springs 218, and/or one or more lower springs 220. According to some embodiments, the carrier 202 may be suspended from the shield can 214 using the upper spring(s) 218. Additionally, or alternatively, the carrier 202 may be suspended from the base structure 216 using the lower spring(s) 220.

Figure 3A:
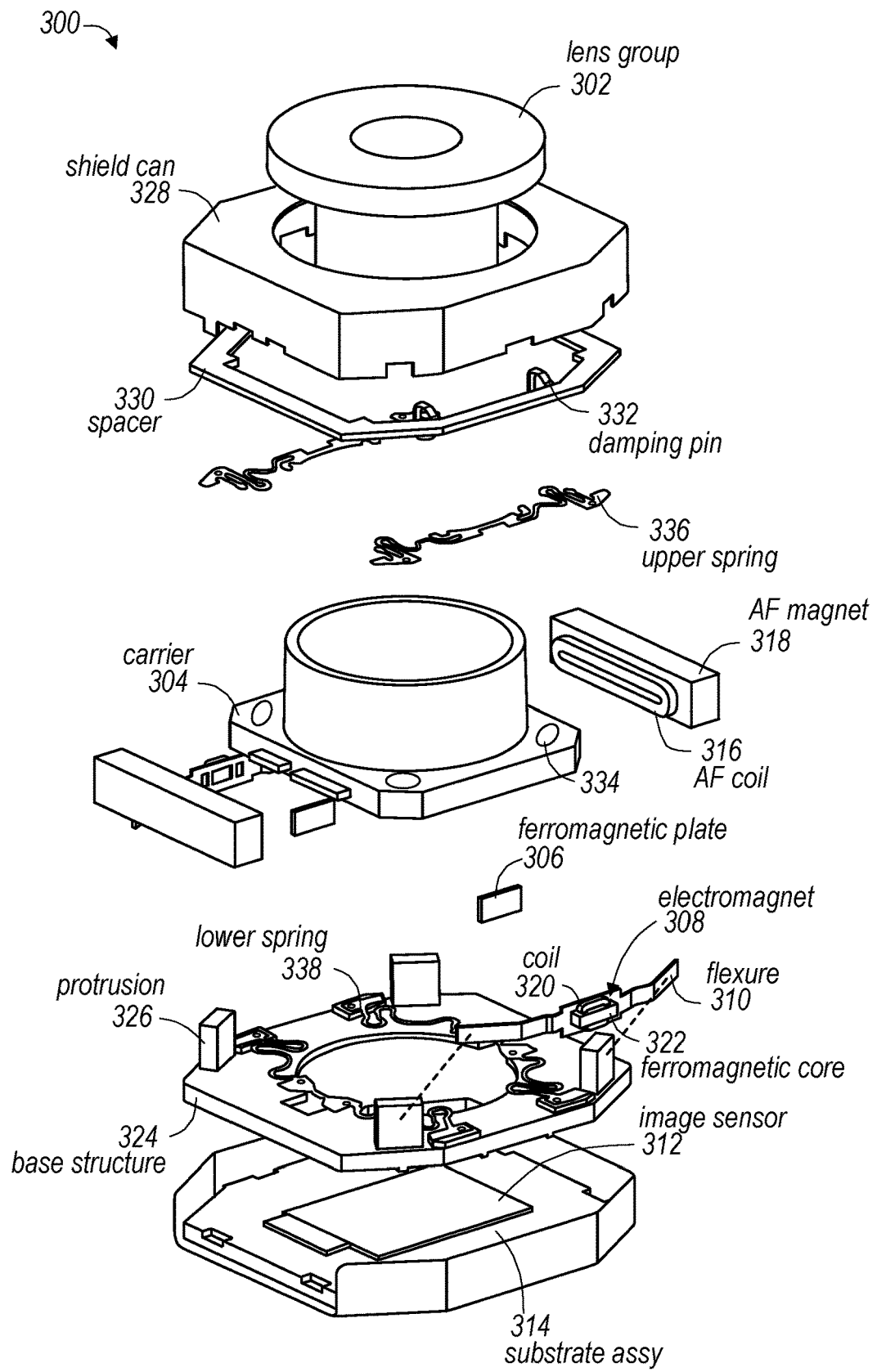
FIGS. 3A-3F illustrate views of an example camera system that includes a locking mechanism, in accordance with some embodiments.
Figure 3B:
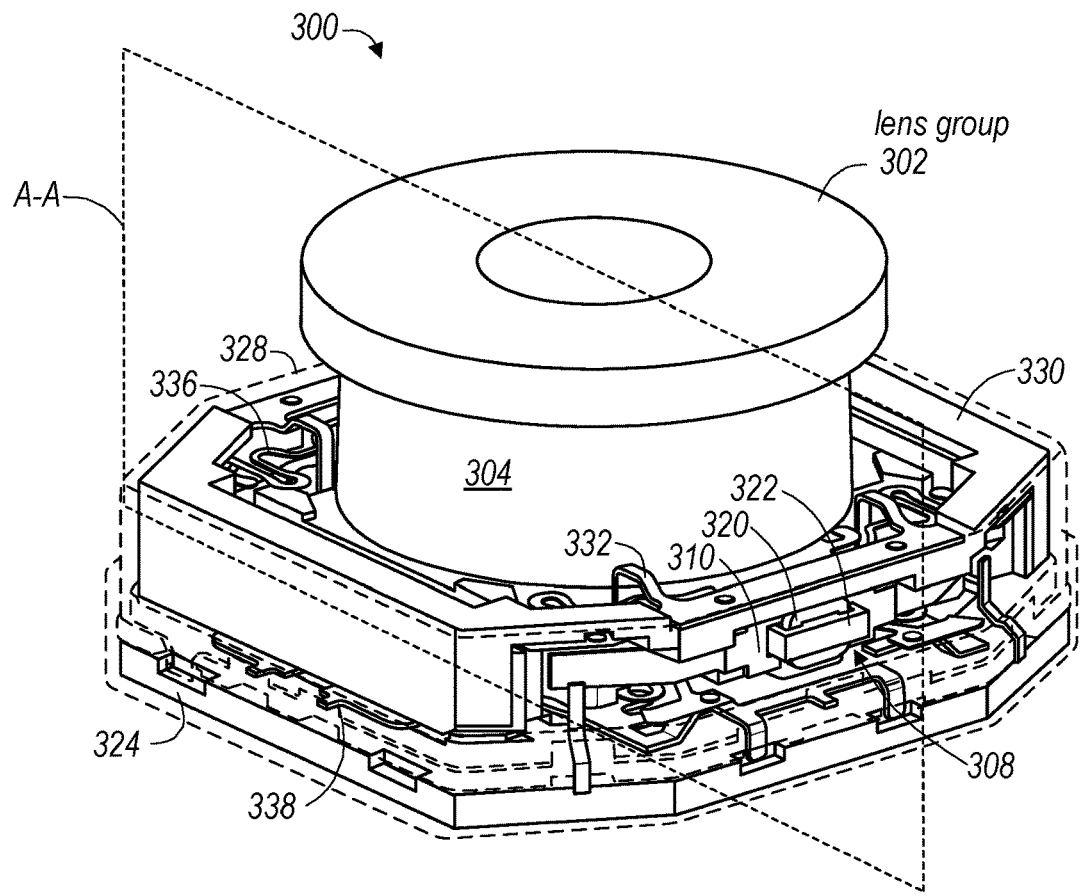
Figure 3C:
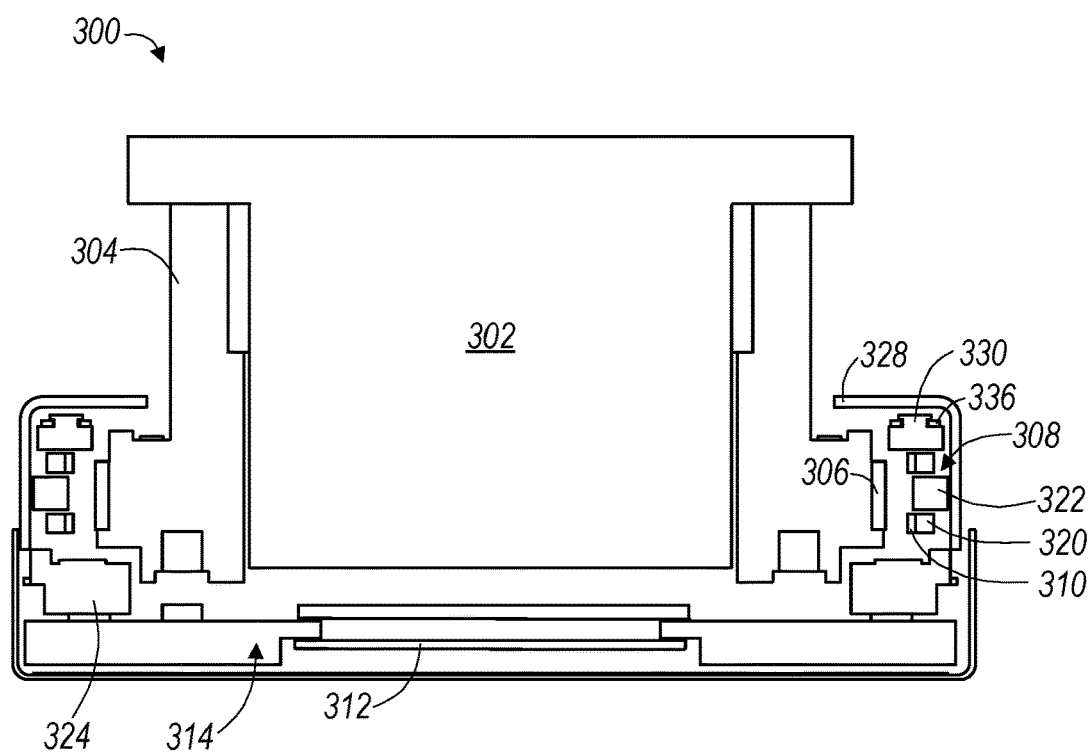
Figure 3D:
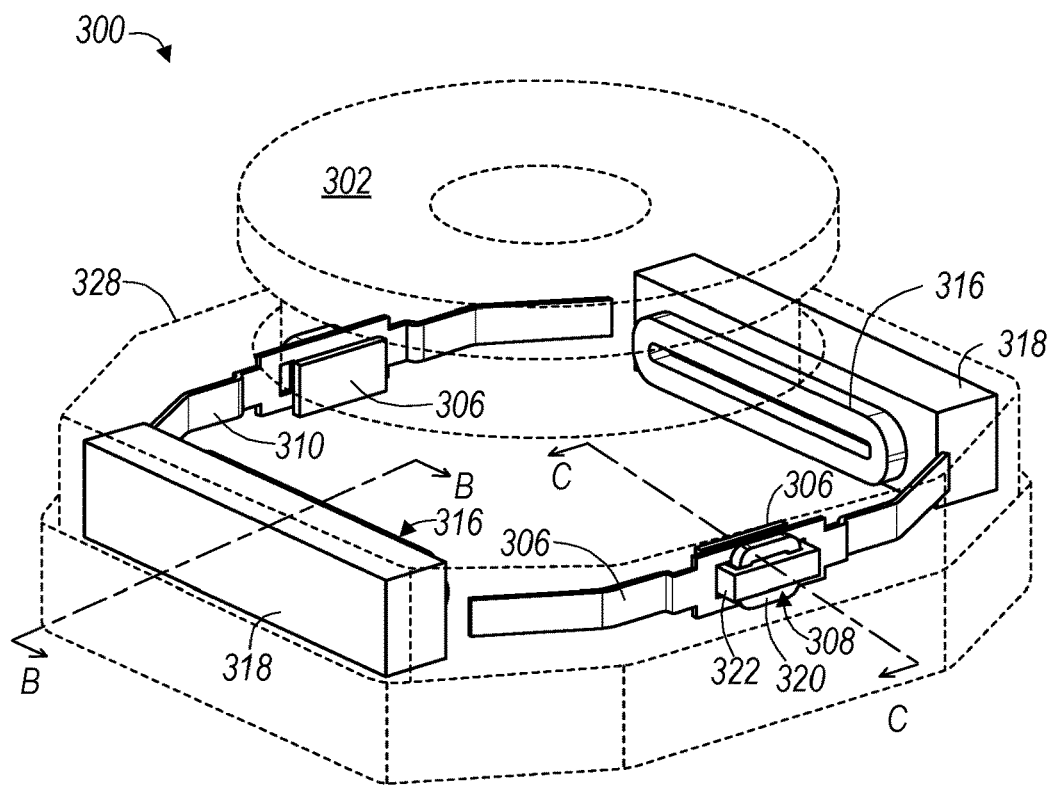
Figure 3E:
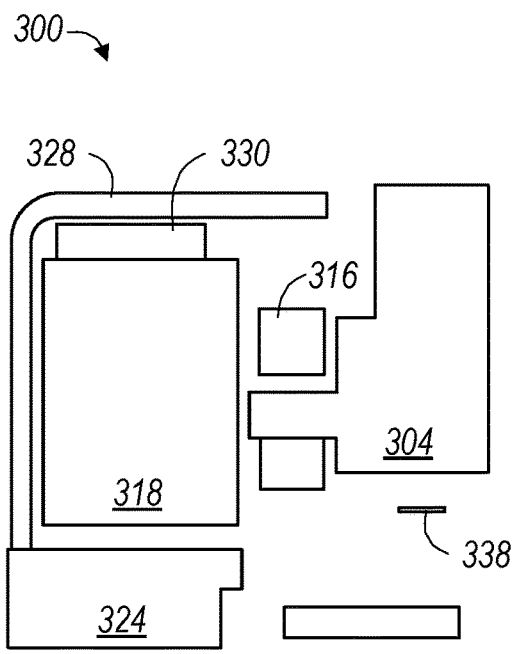
Figure 3F:
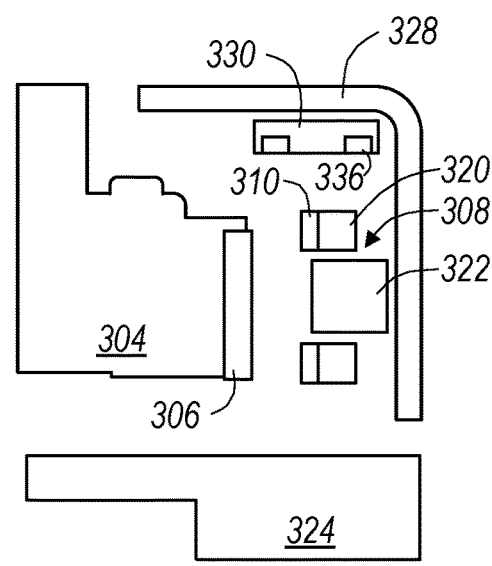

FIGS. 3A-3F illustrate views of an example camera system 300 that includes a locking mechanism, in accordance with some embodiments. FIG. 3A shows an exploded perspective view of the camera system 300. FIG. 3B shows a collapsed perspective view of the camera system 300. FIG. 3C shows a side cross-sectional view, taken at section plane A-A indicated in FIG. 3B, of the camera system 300. FIG. 3D shows another perspective view of the camera system 300. FIG. 3E shows a side cross-sectional view, taken at section line B-B indicated in FIG. 3D, of the camera system 300. FIG. 3F shows another side cross-sectional view, taken at section line C-C indicated in FIG. 3D, of the camera system 300.

According to some embodiments, the camera system 300 may include a lens group 302, a carrier 304, a locking mechanism (e.g., comprising one or more ferromagnetic plates 306, one or more electromagnets 308, and one or more flexures 310), and an image sensor 312. The lens group 302 may include one or more lens elements. An optical axis may be defined by the lens group 302 and/or the image sensor 312 in some embodiments. According to various embodiments, the lens group 302 may be fixedly coupled with the carrier 304, and the image sensor 312 may be fixedly coupled with one or more stationary structures (e.g., a substrate assembly 314) of the camera system 300.

The camera system 300 may include an actuator for moving the carrier 304, e.g., in one or more directions parallel to the optical axis for focusing purposes. In some examples, the actuator may be an autofocus (AF) voice coil motor (VCM) actuator. In the illustrated example, the AF VCM actuator may include one or more AF coils 316 and one or more AF magnets 318. The AF VCM actuator may be configured to move the carrier 304 (together with the lens group 302) relative to the image sensor 312 in some embodiments.

As previously mentioned, the locking mechanism may include ferromagnetic plate(s) 306, electromagnet(s) 308, and flexure(s) 310. In some embodiments, an electromagnet 308 may include a coil 320 and a ferromagnetic core 322. The electromagnet 308 may be coupled with a flexure 310, e.g., as indicated in FIGS. 1A-6C. In some embodiments, the electromagnet 308 may be attached to a first portion (e.g., a central portion) of the flexure 310, and one or more other portions of the flexure 310 may be attached to one or more stationary structures of the camera system 300. As a non-limiting example, a second portion (e.g., an end portion) and a third portion (e.g., another end portion) of the flexure 310 may be attached to a base structure 324. According to some embodiments, the second portion of the flexure 310 may be attached to a protrusion 326 of the base structure 324, and the third portion of the flexure 310 may be attached to another protrusion 326 of the base structure 324, e.g., as indicated in FIG. 3A.

In some embodiments, the camera system 300 may include a shield can 328, a spacer 330, one or more damping pins 332, one or more pockets 334 for containing viscoelastic material, an upper spring 336, and/or a lower spring 338. The shield can 328 may encase at least a portion of the camera system 300. For example, as indicated in FIGS. 3A-3F, the shield can 328 may cover at least a portion of the electromagnetic components of the camera system 300 in some embodiments. According to some embodiments, the shield can 328 may shield the camera system 300 from electromagnetic interference from one or more components external to the camera system 300.

The spacer 330 may be attached to an underside of the shield can 328 in some embodiments. The damping pin(s) 332 may protrude downward from the spacer 330. Furthermore, the damping pin(s) 332 may be configured to extend toward corresponding pocket(s) 334 in the carrier 304. The pocket(s) 334 may be configured to contain viscoelastic material, and at least a portion of the damping pin(s) 332 may be configured to be disposed within the viscoelastic material. The portion(s) of the damping pin(s) 332 that are disposed within the viscoelastic material may traverse the viscoelastic material so as to dampen undesirable motion that may negatively impact performance of the camera system 300. According to some non-limiting examples, when focusing, desirable motion may be in directions parallel to the optical axis, and undesirable motion may be in directions orthogonal to the optical axis. In such examples, the damping pin(s) 332 may be used to mitigate motion in the directions orthogonal to the optical axis.

In some embodiments, the upper spring 336 and/or lower spring 338 may be used to suspend the carrier 304 while allowing motion of the carrier 304 in direction(s) parallel to the optical axis. According to some embodiments, a first portion of the upper spring 336 may be attached to the spacer 330, and a second portion of the upper spring 336 may be attached to the carrier 304. Additionally, or alternatively, a first portion of the lower spring 338 may be attached to the base structure 324, and a second portion of the lower spring 338 may be attached to the carrier 304.

Figure 4:
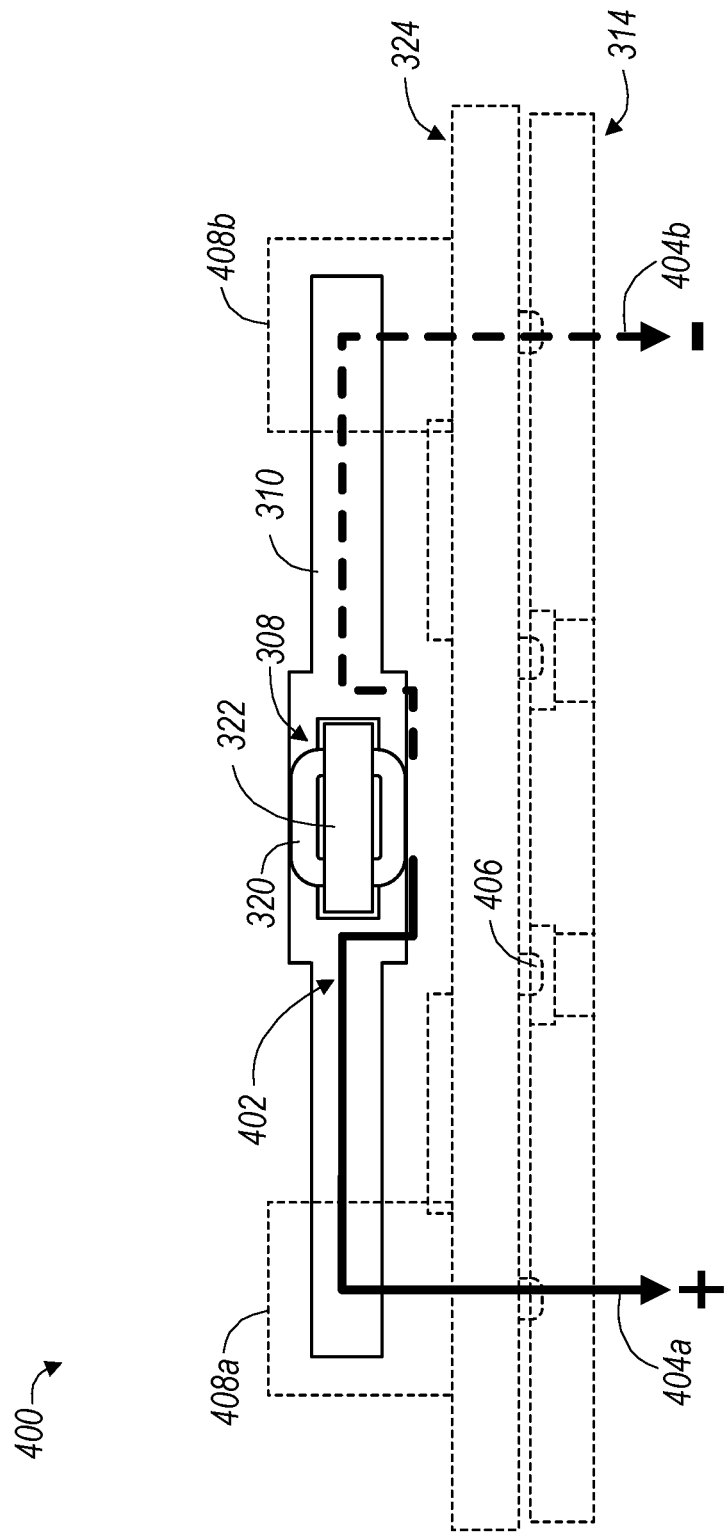
FIG. 4 illustrates an example electrical connection path that may be used for driving a locking mechanism of a camera system, in accordance with some embodiments.

FIG. 4 illustrates an example 400 of an electrical connection path 402 that may be used for driving a locking mechanism 308 of a camera system, in accordance with some embodiments. In some embodiments, the electrical connection path 402 may include a positive (+) signal path 404a and a negative (−) signal path 404b, e.g., as indicated in FIG. 4. The electrical connection path 402 may enable the conveyance of electrical current to a coil 320 of the electromagnet 308. For example, one or more components (e.g., a driver) coupled with the substrate assembly 314 may be capable of providing electrical current to the coil 320 via the electrical connection path 402 (e.g., via the positive signal path 404a and/or the negative signal path 404b). In various embodiments, the electrical connection path 402 may comprise a series of electrical connections, including electrical connections between components that are located between the substrate assembly 314 and the coil 320.

As a non-limiting example, the substrate assembly 314 may be electrically connected to the base structure 324, e.g., via one or more electrical contacts 406. As previously mentioned, the base structure 324 may include one or more upward protrusions. While FIG. 4 shows two example protrusions 408—a first protrusion 408a and a second protrusion 408b—it should be understood that various embodiments may comprise different numbers of protrusions 408. The perspective view in FIG. 3A, for example, shows the base structure 324 having four corner protrusions 326. The base structure 324 may be electrically connected to the flexure 310 via the protrusions 408 in some embodiments.

As indicated in FIG. 4, a first portion (e.g., an end portion) of the flexure 310 may be attached to the first protrusion 408a, and a second portion (e.g., another end portion) of the flexure 310 may be attached to the second protrusion 408b in some embodiments. Furthermore, the coil 320 may be electrically connected to the flexure 310. For example, as indicated in FIG. 4, the coil 320 may be electrically connected to a third portion (e.g., a central portion) of the flexure 310 according to some embodiments. The third portion of the flexure 310 may be located between the first portion and the second portion of the flexure 310.

According to various embodiments, such a series of electrical connections may enable the conveyance of electrical current from the substrate assembly 314 to the base structure 324, then from the base structure 324 to the flexure 310, and then from the flexure 310 to the coil 320. According to various embodiments, the electrical connection path 402 may comprise one or more conductive materials. Furthermore, portions of the electrical connection path 402 may include electrical traces and/or vias that enable the conveyance of electrical current from one location to another.

FIGS. 5A-5C illustrate respective example schematic arrangements for locking mechanisms of camera systems, in accordance with some embodiments. FIG. 5A shows a top view of a first locking mechanism arrangement 500a that may be used in a camera system that has side magnets. FIG. 5B shows a top view of a second locking mechanism arrangement 500b that may be used in a camera system that has side magnets. FIG. 5C shows a top view of another locking mechanism arrangement 500c that may be used in a camera system that has corner magnets.

In FIG. 5A, the first locking mechanism arrangement 500a may include a ferromagnetic plate 502, an electromagnet 504, and a flexure 506. As previously mentioned, the camera system in FIG. 5A may have side magnets 508. For example, the camera system may include a first side magnet

508a at a first side of the camera system, and a second side magnet 508b at a second side of the camera system that is opposite the first side (e.g., relative to a lens group 510). The first locking mechanism arrangement 500a may be located at a third side of the camera system. In some embodiments, the third side may have a longest dimension that is orthogonal to the longest dimensions of the first side and the second side.

Although not shown in FIG. 5A, the camera system may further include a fourth side that is opposite the third side, relative to the lens group 510 in various embodiments. A second ferromagnetic plate 502, a second electromagnet 504, and a second flexure 506 may be located at the fourth side. In some embodiments, the fourth side may have a longest dimension that is parallel to the longest dimension of the third side. Additionally, or alternatively, the fourth side may have a longest dimension that is orthogonal to the longest dimensions of the first side and the second side.

According to various embodiments, the electromagnet 504 may include a coil 512 and a ferromagnetic core 514. As previously indicated (e.g., with reference to the electromagnets in FIGS. 2-4), the coil 512 and the ferromagnetic core 514 may be configured to electromagnetically interact with one another, e.g., when an electrical current is provided to the coil 512. This may produce a magnetic field that attracts the ferromagnetic plate 502 and the electromagnet 504 toward one another. The force(s) of attraction may overcome the counteracting spring force(s), from the flexure 506, acting on the electromagnet 504. Upon ceasing to provide an electrical current to the coil 512, the counteracting spring force(s) from the flexure 506 may retract the electromagnet 504 away from the ferromagnetic plate 502, e.g., back to an "original" and/or "rest" position of electromagnet 504.

In some embodiments, the camera system may further include side coils 516 configured to magnetically interact with the side magnets 508 to move the carrier 518 in one or more directions parallel to an optical axis of the camera system. For example, the first side magnet 508a and the first side coil 516a may be a first magnet-coil pair of the camera system. Similarly, the second side magnet 508b and the second side coil 516b may be a second magnet-coil pair of the camera system. Each magnet-coil pair of the camera system may comprise at least one magnet and at least one corresponding coil that are configured to electromagnetically interact with one another.

In FIG. 5B, the second locking mechanism arrangement 500b may include multiple ferromagnetic plates and electromagnets at a same side of the camera system. For example, the second locking mechanism arrangement 500b may include, at a side of the camera system, a first ferromagnetic plate 520a and a corresponding first electromagnet 522a. Furthermore, the second locking mechanism arrangement may include, at the same side, a second ferromagnetic plate 520b and a corresponding second electromagnet 522b. As indicated in FIG. 5B, the second locking mechanism 500b may include a flexure 524 that is shared by both the first electromagnet 522a and the second electromagnet 522b in various embodiments. It should be understood, however, that multiple flexures may be used at a same side of the camera system, in some embodiments. As a non-limiting example, a respective flexure may be used for each of the first electromagnet 522a and the second electromagnet 522b.

As previously mentioned, the camera system in FIG. 5B may have side magnets 508. For example, the camera system may include a first side magnet 508a at a first side of the camera system, and a second side magnet 508b at a second side of the camera system that is opposite the first side (e.g., relative to a lens group 510). The first locking mechanism arrangement 500a may be located at a third side of the camera system. In some embodiments, the third side may have a longest dimension that is orthogonal to the longest dimensions of the first side and the second side.

Although not shown in FIG. 5B, the camera system may further include a fourth side that is opposite the third side, relative to the lens group 510 in various embodiments. A third ferromagnetic plate, a corresponding third electromagnet, a fourth ferromagnetic plate, a corresponding fourth electromagnet, and/or another flexure may be located at the fourth side in some embodiments. In some embodiments, the fourth side may have a longest dimension that is parallel to the longest dimension of the third side. Additionally, or alternatively, the fourth side may have a longest dimension that is orthogonal to the longest dimensions of the first side and the second side.

According to various embodiments, the first electromagnet 522a may include a first coil 526a and a first ferromagnetic core 528a. Furthermore, the second electromagnet 522b may include a second coil 526b and a second ferromagnetic core 528b. As previously indicated (e.g., with reference to the electromagnets in FIGS. 2-4), a coil and a ferromagnetic core may be configured to electromagnetically interact with one another, e.g., when an electrical current is provided to the coil. This may produce a magnetic field that attracts a corresponding ferromagnetic plate and the electromagnet toward one another. The force(s) of attraction may overcome the counteracting spring force(s), from the flexure, acting on the electromagnet. Upon ceasing to provide an electrical current to the coil, the counteracting spring force(s) from the flexure may retract the electromagnet away from the ferromagnetic plate, e.g., back to an "original" and/or "rest" position of electromagnet.

In FIG. 5C, the third locking mechanism 500c may include a ferromagnetic plate 530, an electromagnet 532, and a flexure 534. As previously mentioned, the camera system in FIG. 5C may have corner magnets 536. For example, the camera system may include a first corner magnet 508a at a first corner that is at least partially defined by a juncture between a first pair of sides of the camera system. Furthermore, the camera system may include a second corner magnet 508b at a second corner that is at least partially defined by a juncture between a second pair of sides of the camera system, e.g., as indicated in FIG. 5C. The third side may be opposite the second side (e.g., relative to the lens group 510).

According to some embodiments in which the camera system has corner magnets instead of side magnets, the third locking mechanism 500c may include one or more ferromagnetic plates, electromagnets, and/or flexures at any number of sides of the camera system.

According to various embodiments, the electromagnet 532 may include a coil 538 and a ferromagnetic core 540. As previously indicated (e.g., with reference to the electromagnets in FIGS. 2-4), the coil 538 and the ferromagnetic core 540 may be configured to electromagnetically interact with one another, e.g., when an electrical current is provided to the coil 538. This may produce a magnetic field that attracts the ferromagnetic plate 530 and the electromagnet 532 toward one another. The force(s) of attraction may overcome the counteracting spring force(s), from the flexure 534, acting on the electromagnet 532. Upon ceasing to provide an electrical current to the coil 538, the counteracting spring force(s) from the flexure 534 may retract the electromagnet 532 away from the ferromagnetic plate 530, e.g., back to an "original" and/or "rest" position of electromagnet 532.

In some embodiments, the camera system may further include a coil 542 configured to magnetically interact with the corner magnets 336 to move the carrier 544 in one or more directions parallel to an optical axis of the camera system. As indicated in FIG. 5C, the coil 542 may be attached to the carrier 544. In some embodiments, the coil 542 may at least partially encircle the carrier 544 and/or the lens group 510.

Figure 6C:
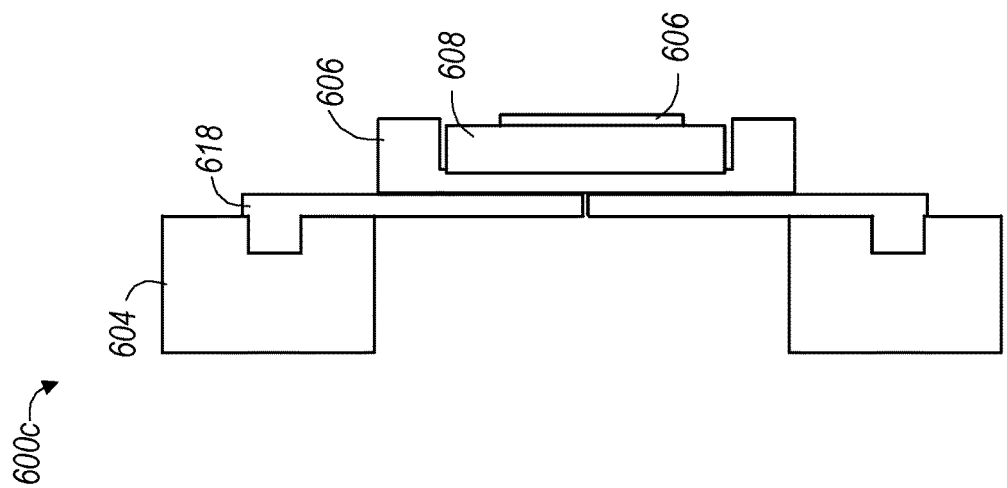
FIGS. 6A-6C illustrate respective example arrangements for flexures of locking mechanisms of camera systems, in accordance with some embodiments.
Figure 6B:
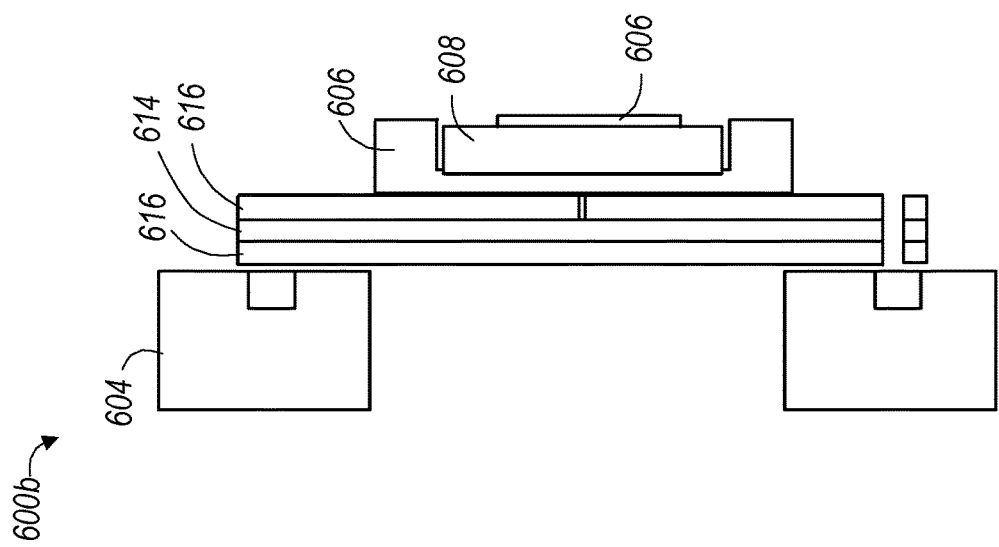
Figure 6A:
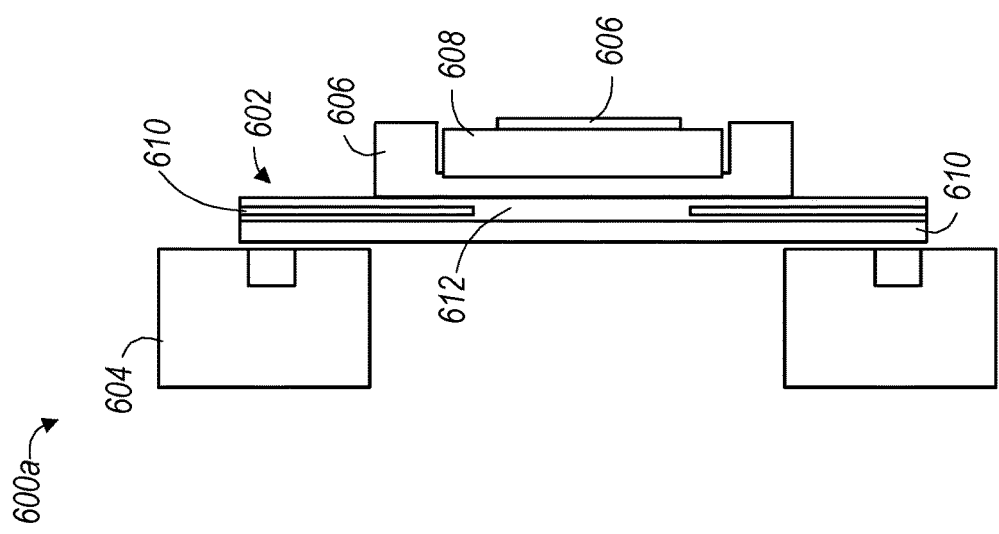

FIGS. 6A-6C illustrate respective example arrangements for flexures of locking mechanisms of camera systems, in accordance with some embodiments. FIG. 6A shows a top view of an example flexure arm arrangement 600a. FIG. 6B shows a top view of an example clad-like flexure arrangement 600b. FIG. 6C shows a top view of an example leaf spring flexure arrangement 600c.

In some embodiments, the flexure arm arrangement 600a may include one or more flexure arms 602 that extend from a stationary structure 604 to the electromagnet (e.g., comprising ferromagnetic core 606 and coil 608), e.g., as indicated in FIG. 6A. In some embodiments, the flexure arm(s) may comprise one or more conductive material layers 610 and one or more dielectric material layers 612. In some examples, at least a portion of the conductive material may be adjacent the dielectric material and may function as an electrical signal trace for conveying electrical signals between the stationary structure 604 and the coil 608 via the flexure arms 602. According to some embodiments, the flexure arms 602 may be formed using one or more additive and/or subtractive manufacturing processes.

In some embodiments, the clad-like flexure arrangement 600b may include a layer of dielectric material 614 cladded with layers of a conductive material 616, e.g., as indicated in FIG. 6B. According to some embodiments, a first layer of conductive material 616 may be adjacent the stationary structure 604, a second layer of conductive material 616 may be adjacent the electromagnet, and a layer of dielectric material 614 may be sandwiched between the first and second layers of conductive material 616.

In some embodiments, the leaf spring flexure arrangement 600c may include a leaf spring 618 formed of a conductive material, e.g., as indicated in FIG. 6C. The leaf spring 618 may extend from the stationary structure 604 to the electromagnet.

Figure 7:
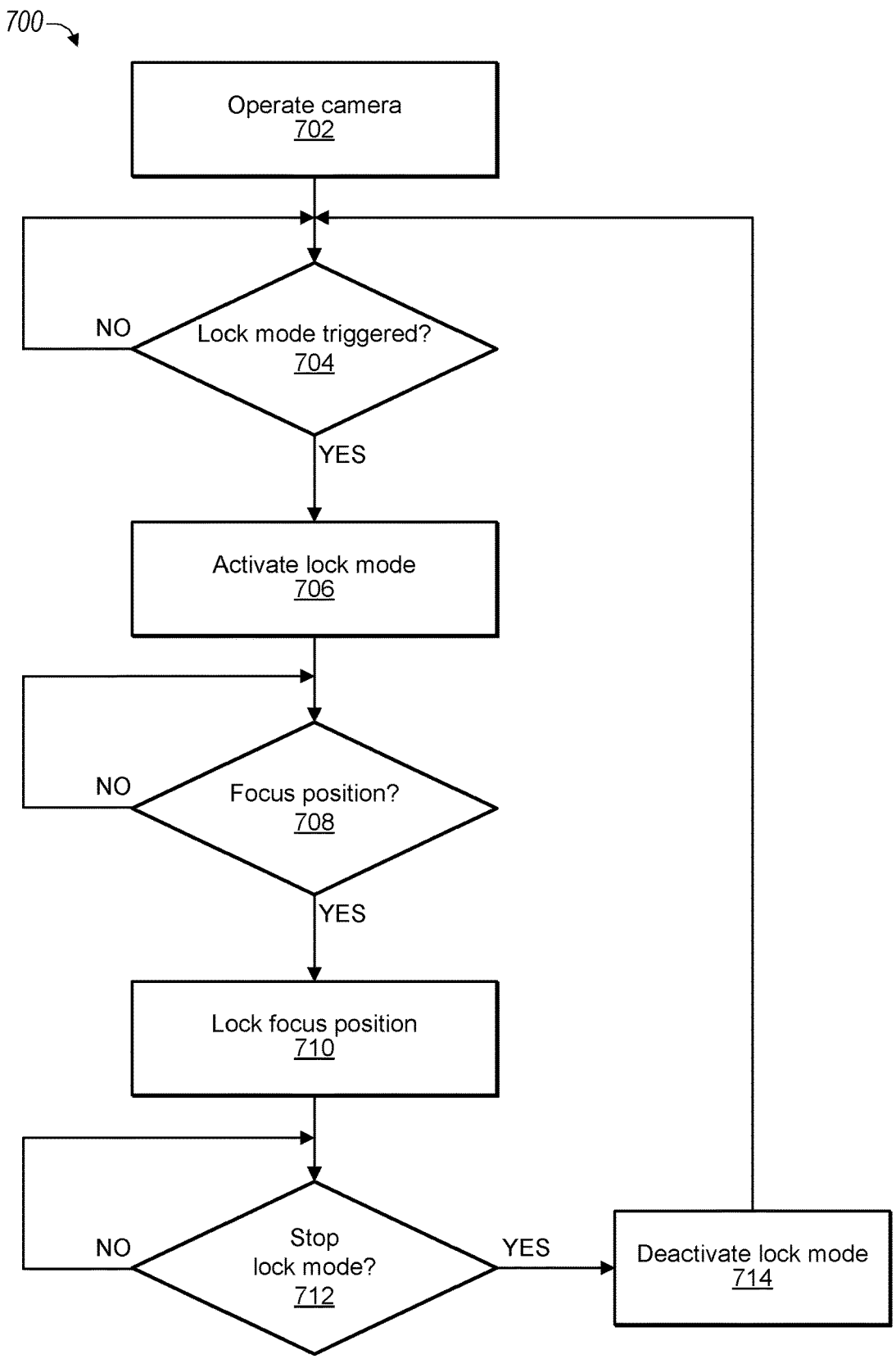
FIG. 7 is a flowchart of an example method of operating a locking mechanism of a camera system, in accordance with some embodiments.

FIG. 7 is a flowchart of an example method 700 of operating a locking mechanism of a camera system, in accordance with some embodiments. At 702, the process 700 may include operating a camera. For example, a user may use a camera application on a mobile device to perform one or more functions with a camera of the mobile device. The user may, for example, use the camera to capture one or more images and/or videos.

At 704, the process 700 may include determining whether a lock mode of the camera is triggered. In some examples, the lock mode of the camera may be triggered via a user interface of the camera application. The user interface may be presented on a display of the mobile device, for example. According to some examples, a user of the mobile device may provide input via one or more selections of options and/or features, presented via the user interface, indicating an instruction triggering the lock mode. In some non-limiting embodiments, the user may desire to activate the lock mode when the user is about to participate in an active experience associated with a high degree of motion and/or instability. As previously mentioned, some non-limiting examples may include "active" users who would like to capture video using the camera system while riding a motorcycle, snowboarding, etc.

According to some embodiments, the lock mode of the camera may be triggered automatically in response to one or more predetermined conditions. As a non-limiting example, the camera and/or the mobile device may receive motion data (e.g., via an accelerometer, a gyroscope, etc., of the mobile device) and may analyze the motion data to determine if one or more real-time motion conditions satisfy one or more predetermined motion conditions that automatically trigger the lock mode of the camera. It should be understood that one or more other types of data may additionally or alternatively be analyzed and compared to predetermined condition(s) to determine whether to trigger the lock mode.

If, at 704, it is determined that the lock mode is not triggered, then the process 700 may proceed by periodically and/or continuously monitor whether the lock mode is triggered, according to some embodiments. If, at 704, it is determined that the lock mode is triggered, then the process 700 may proceed by activating the lock mode (at 706).

When the lock mode is activated, the process 700 may include determining whether a focus position has been achieved (at 708). If, at 708, it is determined that the focus position has not been achieved, then the process 700 may proceed by periodically and/or continuously monitor whether the focus position has been achieved. If, at 708, it is determined that the focus position has been achieved, then the process 700 may proceed by locking the focus position (at 710).

At 712, the process 700 may include determining whether to stop the lock mode. For example, a different mode of the camera may be triggered, and in some examples the triggering of one or more different modes of the camera may also cause the process 700 to determine to stop the lock mode. If, at 712, it is determined that the lock mode is not to be stopped, then the process 700 may proceed by periodically and/or continuously monitor whether to stop the lock mode. If, at 712, it is determined that the lock mode is to be stopped, then the process 700 may proceed by deactivating the lock mode (at 714). The process 700 may proceed by periodically and/or continuously monitor whether the lock mode is triggered (at 704).

Figure 8:
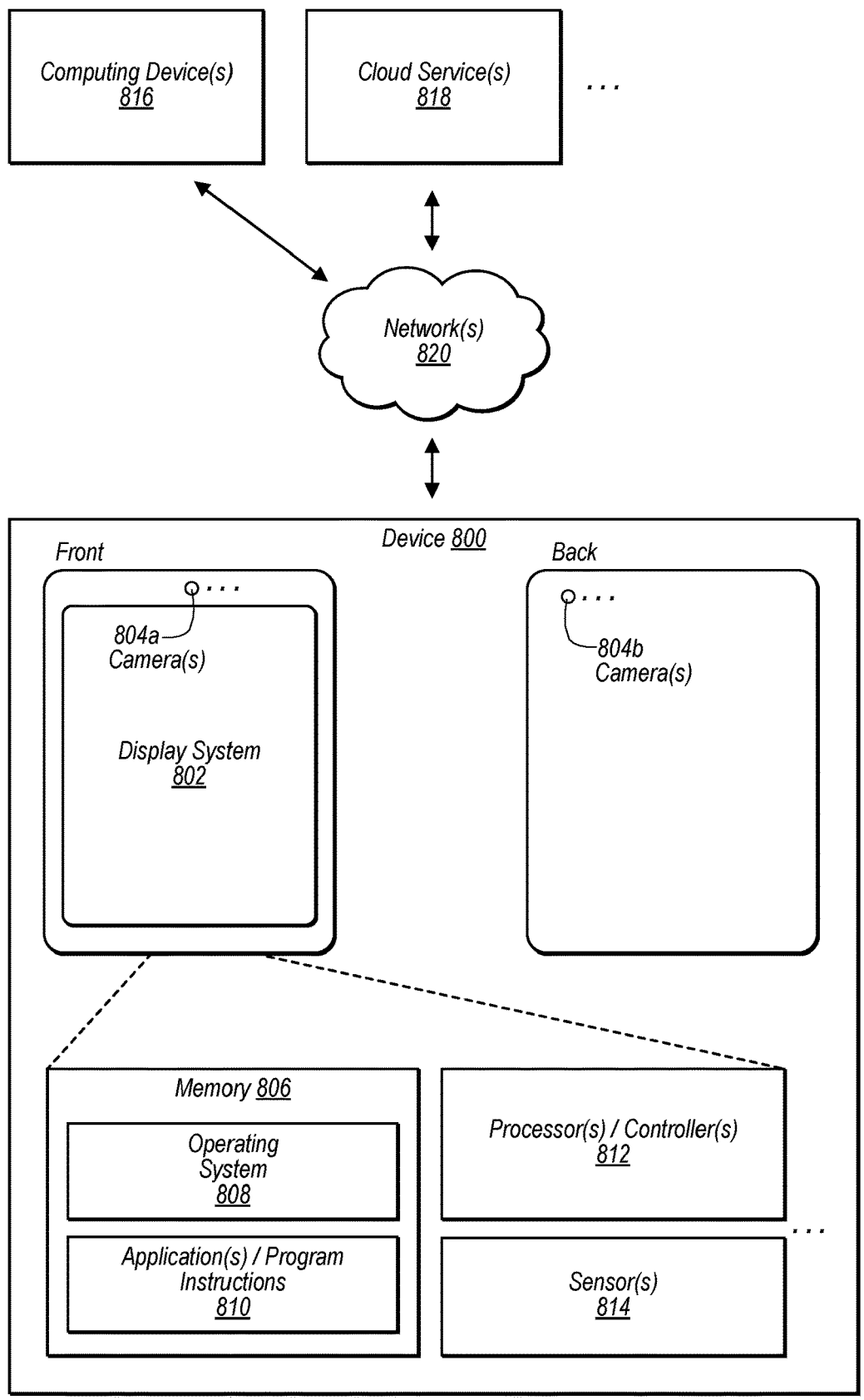
FIG. 8 illustrates a schematic representation of an example environment comprising a device that may include a camera system with a locking mechanism, in accordance with some embodiments.

FIG. 8 illustrates a schematic representation of an example environment comprising a device 800 that may include one or more cameras. For example, the device 800 may include a camera system with a locking mechanism, such as the camera systems and/or locking mechanisms described herein with reference to FIGS. 1A-7. In some embodiments, the device 800 may be a mobile device and/or a multifunction device. In various embodiments, the device 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 800 may include a display system 802 (e.g., comprising a display and/or a touch-sensitive surface) and/or one or more cameras 804. In some non-limiting embodiments, the display system 802 and/or one or more front-facing cameras 804a may be provided at a front side of the device 800, e.g., as indicated in FIG. 8. Additionally, or alternatively, one or more rear-facing cameras 804b may be provided at a rear side of the device 800. In some embodiments comprising multiple cameras 804, some or all of the cameras 804 may be the same as, or similar to, each other. Additionally, or alternatively, some or all of the cameras 804 may be different from each other. In various embodiments, the location(s) and/or arrangement(s) of the camera(s) 804 may be different than those indicated in FIG. 8.

Among other things, the device 800 may include memory 806 (e.g., comprising an operating system 808 and/or application(s)/program instructions 810), one or more processors and/or controllers 812 (e.g., comprising CPU(s), memory controller(s), display controller(s), and/or camera controller(s), etc.), and/or one or more sensors 814 (e.g., orientation sensor(s), proximity sensor(s), and/or position sensor(s), etc.). In some embodiments, the device 800 may communicate with one or more other devices and/or services, such as computing device(s) 816, cloud service(s) 818, etc., via one or more networks 820. For example, the device 800 may include a network interface (e.g., network interface 910 in FIG. 9) that enables the device 800 to transmit data to, and receive data from, the network(s) 820. Additionally, or alternatively, the device 800 may be capable of communicating with other devices via wireless communication using any of a variety of communications standards, protocols, and/or technologies.

Figure 9:
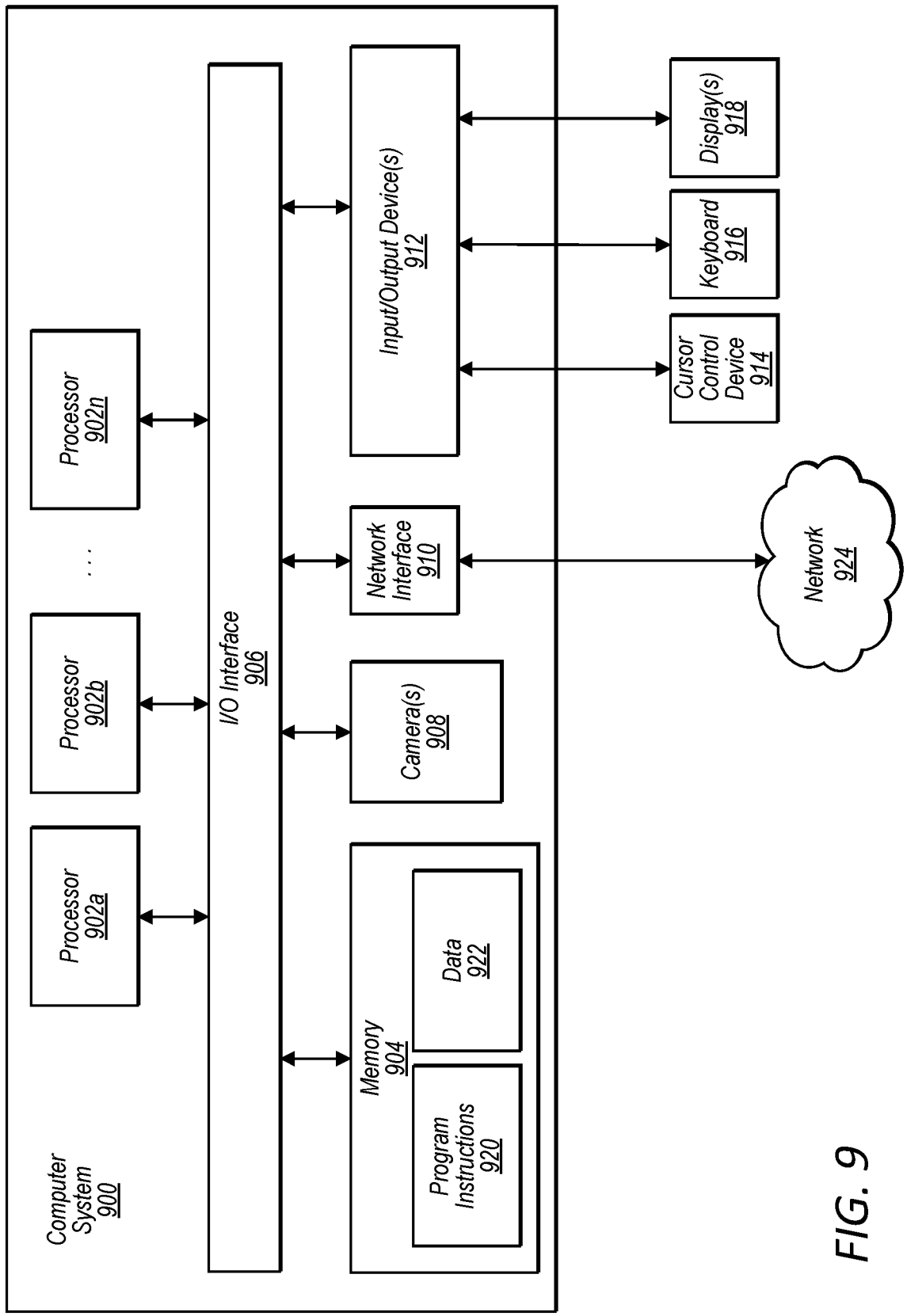
FIG. 9 illustrates a schematic block diagram of an example environment comprising a computer system that may include a camera system with a locking mechanism, in accordance with some embodiments.

FIG. 9 illustrates a schematic block diagram of an example environment comprising a computer system 900 that may include a camera system with a locking mechanism, such as the camera systems and/or locking mechanisms described herein with reference to FIGS. 1A-8. In addition, computer system 900 may implement methods for controlling operations of the camera and/or for performing image processing on images captured with the camera. In some embodiments, the device 800 (described herein with reference to FIG. 8) may additionally, or alternatively, include some or all of the functional components of the described herein.

The computer system 900 may be configured to execute any or all of the embodiments described above. In different embodiments, computer system 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 900 includes one or more processors 902 coupled to a system memory 904 via an input/output (I/O) interface 906. Computer system 900 further includes one or more cameras 908 coupled to the I/O interface 906. Computer system 900 further includes a network interface 910 coupled to I/O interface 906, and one or more input/output devices 912, such as cursor control device 914, keyboard 916, and display(s) 918. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 902, or a multiprocessor system including several processors 902 (e.g., two, four, eight, or another suitable number). Processors 902 may be any suitable processor capable of executing instructions. For example, in various embodiments processors 902 may be general-purpose or embedded processors implementing any of a variety of instruction set architectures (ISAs), such as the x86, PowerPC, SPARC, or MIPS ISAs, or any other suitable ISA. In multiprocessor systems, each of processors 902 may commonly, but not necessarily, implement the same ISA.

System memory 904 may be configured to store program instructions 920 accessible by processor 902. In various embodiments, system memory 904 may be implemented using any suitable memory technology, such as static random access memory (SRAM), synchronous dynamic RAM (SDRAM), nonvolatile/Flash-type memory, or any other type of memory. Additionally, existing camera control data 922 of memory 904 may include any of the information or data structures described above. In some embodiments, program instructions 920 and/or data 922 may be received, sent or stored upon different types of computer-accessible media or on similar media separate from system memory 904 or computer system 900. In various embodiments, some or all of the functionality described herein may be implemented via such a computer system 900.

In one embodiment, I/O interface 906 may be configured to coordinate I/O traffic between processor 902, system memory 904, and any peripheral devices in the device, including network interface 910 or other peripheral interfaces, such as input/output devices 912. In some embodiments, I/O interface 906 may perform any necessary protocol, timing or other data transformations to convert data signals from one component (e.g., system memory 904) into a format suitable for use by another component (e.g., processor 902). In some embodiments, I/O interface 906 may include support for devices attached through various types of peripheral buses, such as a variant of the Peripheral Component Interconnect (PCI) bus standard or the Universal Serial Bus (USB) standard, for example. In some embodiments, the function of I/O interface 906 may be split into two or more separate components, such as a north bridge and a south bridge, for example. Also, in some embodiments some or all of the functionality of I/O interface 906, such as an interface to system memory 904, may be incorporated directly into processors 902.

Network interface 910 may be configured to allow data to be exchanged between computer system 900 and other devices attached to a network 924 (e.g., carrier or agent devices) or between nodes of computer system 900. Network 924 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 910 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output device(s) 912 may, in some embodiments, include one or more display terminals, keyboards, keypads, touchpads, scanning devices, voice or optical recognition devices, or any other devices suitable for entering or accessing data by one or more computer systems 900. Multiple input/output devices 912 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 910.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 702 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   a lens group comprising one or more lens elements;
   an image sensor;
   a carrier to which the lens group or the image sensor is attached;
   an actuator to move the carrier in at least one direction parallel to an optical axis; and
   a locking mechanism, comprising:
   a ferromagnetic plate fixedly attached to the carrier;
   an electromagnet for electromagnetically interacting with the ferromagnetic plate; and
   a flexure to which the electromagnet is attached, wherein the flexure is further attached to a stationary structure of the camera;
   wherein the camera is operable such that, in a lock mode of the camera, the electromagnet is electrically driven to generate a magnetic field that attracts the ferromagnetic plate, thereby providing a clamping force that prevents the carrier from moving along the optical axis.

2. The camera of claim 1, wherein, in the lock mode, the camera is configured to use the locking mechanism to prevent the carrier from moving along the optical axis so as to lock the lens or the image sensor in a focus position.

3. The camera of claim 1, wherein the electromagnet comprises:
   a coil; and
   a ferromagnetic core.

4. The camera of claim 1, wherein:
   the actuator comprises a voice coil motor (VCM) actuator, the VCM actuator comprising:
   a first magnet-coil pair at a first side of the camera, the first magnet-coil pair comprising a first magnet and a first coil; and
   a second magnet-coil pair at a second side of the camera opposite the first side, the second magnet-coil pair comprising a second magnet and a second coil;
   the ferromagnetic plate is a first ferromagnetic plate at a third side of the camera different than the first side and the second side;
   the electromagnet is a first electromagnet at the third side;
   the flexure is a first flexure at the third side; and
   the locking mechanism further comprises:
   a second ferromagnetic plate at a fourth side of the camera opposite the third side;
   a second electromagnet at the fourth side; and
   a second flexure at the fourth side.

5. The camera of claim 4, wherein the locking mechanism further comprises:
a third ferromagnetic plate attached to the carrier at the third side of the camera; and
a third electromagnet attached to the first flexure at the third side.

6. The camera of claim 1, wherein the lens group is attached to the carrier.

7. The camera of claim 1, wherein the image sensor is attached to the carrier.

8. A device, comprising:
one or more processors;
memory storing program instructions executable by the one or more processors to control operations of a camera; and
the camera, comprising:
a lens group comprising one or more lens elements;
an image sensor;
a carrier to which the lens group or the image sensor is attached;
an actuator to move the carrier in at least one direction parallel to an optical axis; and
a locking mechanism, comprising:
a ferromagnetic plate fixedly attached to the carrier;
an electromagnet for electromagnetically interacting with the ferromagnetic plate; and
a flexure to which the electromagnet is attached, wherein the flexure is further attached to a stationary structure of the camera;
wherein the camera is operable such that, in a lock mode of the camera, the electromagnet is electrically driven to generate a magnetic field that attracts the ferromagnetic plate, thereby providing a clamping force that prevents the carrier from moving along the optical axis.

9. The device of claim 8, wherein:
the lens group is attached to the carrier; and
in the lock mode, the camera is configured to use the locking mechanism to prevent the carrier from moving along the optical axis so as to lock the lens in a focus position.

10. The device of claim 8, wherein the electromagnet comprises:
a coil; and
a ferromagnetic core.

11. The device of claim 8, wherein:
the actuator comprises a voice coil motor (VCM) actuator, the VCM actuator comprising:
a first magnet-coil pair at a first side of the camera, the first magnet-coil pair comprising a first magnet and a first coil; and
a second magnet-coil pair at a second side of the camera opposite the first side, the second magnet-coil pair comprising a second magnet and a second coil;
the ferromagnetic plate is a first ferromagnetic plate at a third side of the camera different than the first side and the second side;
the electromagnet is a first electromagnet at the third side;
the flexure is a first flexure at the third side; and
the locking mechanism further comprises:
a second ferromagnetic plate at a fourth side of the camera opposite the third side;
a second electromagnet at the fourth side; and
a second flexure at the fourth side.

12. The device of claim 8, wherein the flexure comprises a leaf spring formed of a conductive material.

13. The device of claim 8, wherein the flexure comprises flexure arms that extend from the stationary structure to the electromagnet, and wherein one or more of the flexure arms comprise:
a dielectric material; and
a conductive material adjacent the dielectric material, the conductive material forming an electrical signal trace for conveying electrical signals between the stationary structure and a coil of the electromagnet.

14. The device of claim 13, wherein the flexure arms comprise:
a first flexure arm comprising a first electrical signal trace; and
a second flexure arm comprising a second electrical signal trace, wherein the second flexure arm is parallel to the first flexure arm.

15. The device of claim 8, wherein the flexure comprises a layer of dielectric material cladded with layers of a conductive material.

16. The device of claim 8, wherein:
the stationary structure comprises a base of the camera, wherein the base comprises:
a first portion having a longest dimension extending in a first direction orthogonal to the optical axis; and
a second portion comprising one or more protrusions, wherein each of the one or more protrusions extends from the first portion in a second direction parallel to the optical axis.

17. A method, comprising:
activating a lock mode of a camera;
determining that a lens group or an image sensor of the camera is at a focus position, wherein the lens group or the image sensor is attached to a carrier, and wherein the lens group comprises one or more lens elements; and
based at least in part on the activating the lock mode and the determining that the lens or the image sensor is at the focus position, using a locking mechanism to prevent the carrier from moving in at least one direction parallel to an optical axis of the camera, so as to lock the lens or the image sensor in the focus position, wherein the locking mechanism comprises:
a ferromagnetic plate fixedly attached to the carrier;
an electromagnet for electromagnetically interacting with the ferromagnetic plate; and
a flexure to which the electromagnet is attached, wherein the flexure is further attached to a stationary structure of the camera.

18. The method of claim 17, wherein, to use the locking mechanism, the camera is operable to:
electrically drive the electromagnet to generate a magnetic field that attracts the ferromagnetic plate, thereby providing a clamping force that prevents the carrier from moving along the optical axis.

19. The method of claim 17, further comprising:
receiving, via a user interface presented on a device that includes the camera, one or more inputs; and
determining that the one or more inputs satisfy one or more predetermined conditions for activating the lock mode of the camera;
wherein the activating the lock mode is performed based at least in part on the determining that the one or more inputs satisfy the one or more predetermined conditions.

20. The method of claim 17, further comprising:
receiving data via one or more sensors of at least one of the camera or a device that includes the camera; and
determining that the data satisfy one or more predetermined conditions for activating the lock mode of the camera;
wherein the activating the lock mode is performed based at least in part on the determining that the data satisfy the one or more predetermined conditions.

* * * * *